United States Patent
Athani et al.

(10) Patent No.: US 9,946,740 B2
(45) Date of Patent: Apr. 17, 2018

(54) HANDLING SERVER AND CLIENT OPERATIONS UNINTERRUPTEDLY DURING PACK AND AUDIT PROCESSES

(71) Applicants: Rajeev Athani, Bangalore (IN); Manjunatha Nanjundappa, Bangalore (IN); Rajesh Sidappa Kuri, Bangalore (IN)

(72) Inventors: Rajeev Athani, Bangalore (IN); Manjunatha Nanjundappa, Bangalore (IN); Rajesh Sidappa Kuri, Bangalore (IN)

(73) Assignee: Unisys Corporation, Blue Bell, PA (US)

( * ) Notice: Subject to any disclaimer, the term of this patent is extended or adjusted under 35 U.S.C. 154(b) by 424 days.

(21) Appl. No.: 14/666,570

(22) Filed: Mar. 24, 2015

(65) Prior Publication Data
US 2016/0110265 A1    Apr. 21, 2016

(30) Foreign Application Priority Data
Oct. 20, 2014   (IN) .......................... 2989/DEL/2014

(51) Int. Cl.
*G06F 17/30*    (2006.01)
*G06F 11/14*    (2006.01)

(52) U.S. Cl.
CPC .... *G06F 17/30312* (2013.01); *G06F 11/1471* (2013.01); *G06F 17/30171* (2013.01); *G06F 17/30424* (2013.01); *G06F 2201/80* (2013.01); *G06F 2201/81* (2013.01)

(58) Field of Classification Search
USPC .................................................. 707/609, 654
See application file for complete search history.

(56) References Cited

U.S. PATENT DOCUMENTS

| | | | |
|---|---|---|---|
| 5,590,274 A * | 12/1996 | Skarpelos ........... | G06F 11/1474 714/6.32 |
| 7,130,382 B2 * | 10/2006 | Thacker ............... | H04L 41/069 379/15.01 |
| 7,181,560 B1 * | 2/2007 | Grand .................... | G06F 1/206 710/300 |
| 7,293,043 B1 * | 11/2007 | Fallis ..................... | H04L 41/08 707/648 |
| 7,395,232 B1 * | 7/2008 | Pilato .................... | G06Q 40/02 705/35 |
| 7,526,178 B2 * | 4/2009 | Harradine ......... | G06F 17/30817 386/248 |
| 7,647,628 B2 * | 1/2010 | Kebinger ............... | G06F 21/31 713/183 |
| 7,962,458 B2 * | 6/2011 | Holenstein .......... | G06F 11/2094 707/638 |

(Continued)

*Primary Examiner* — Kim Nguyen (57) ABSTRACT

A solution for maintaining the operation of a server and allowing the transfer of data from client devices to a database without locking the database during an audit and pack process is realized that reduces the amount of time lost due to backup file storage transfer. When a file is backed up to a first storage trail through the audit process, the trail may eventually become filled to capacity. Upon the first storage trail filling to capacity, a pack process is initiated, and a backup storage trail is created to store the data during this process. Upon completion of the pack process, the data from the backup storage trail is transferred to another active storage trail.

18 Claims, 10 Drawing Sheets

(56) References Cited

U.S. PATENT DOCUMENTS 8,301,593 B2 * 10/2012 Hoffmann ........... G06F 11/2097
707/615
8,604,903 B2 * 12/2013 Bowen ............... G07C 9/00158
340/5.27
9,171,330 B2 * 10/2015 Woods .................. G06Q 40/00

* cited by examiner

HANDLING SERVER AND CLIENT OPERATIONS UNINTERRUPTEDLY DURING PACK AND AUDIT PROCESSES

FIELD OF THE DISCLOSURE

The instant disclosure relates to application development. More specifically, this disclosure relates to management of business-related information in databases.

BACKGROUND

Business information Server (BIS) system is a product that allows users to design and control their own database applications without the need for advanced computer programming knowledge and skills. For example, a manager of a human resources (HR) department at a company may design a database application in BIS containing employee information such as an employee's name, an employee's company identification number, an employee's home address, an employee's home telephone number and/or the like. Once this information is stored into a database, a host of functions may be performed on the information such as sorting, searching, calculating, modifying, comparing and/or the like. Business Information Server software operates according to a client-server model in which a user of a client device sends a request to a server to perform one or more of the aforementioned functions. An administrator that may be coupled to the server controls administrative activities associated with serving the request. These administrative activities may include setting up default configurations, manipulating data files, or performing audit-related tasks.

Due to the number of users interacting with the server at one time, it may be useful to create a record of changes to or a back-up copy of a file's contents every time a modification is made to a file. One solution to tracking changes in a file or database is to provide an audit feature to write the changes made to the server into a back-up file that may be kept in an audit trail that is separate from the database. The audit feature is configured by the administrator, and when it is enabled, the copy of the file is stored in an audit trail. Conventionally, two audit trails may be configured. A first audit trail may be an active audit trail, while a second audit trail may be an inactive audit trail. When the active audit trail is filled to capacity, a process begins that deactivates the active audit trail and switches an inactive audit trail to an active trail to continue receiving back-up file information from the administrator.

While performing this pack process, the database is locked, and applications are not able to make any updates to the server. Consequently, the applications, and the users using the applications, must wait for the pack process to terminate and the database to be unlocked before continuing to access the database. The pack process may take a considerable amount of time to complete and cause unnecessary delay for the applications and users. This delay may be unacceptable when a user has limited time to perform a transaction in the database. For example, when a user is submitting updates to the server (prior to boarding a flight, the user only has a short amount of time to perform the update before boarding the plane and losing internet connections to the server. Thus, there is a need to provide a solution that allows a user to make updates to information through the server without incurring long delays during the pack process when an active audit trail is filled to capacity.

SUMMARY

A third audit trail may be used by an information server, such as BIS, to reduce the amount of time a database is locked. This third audit trail may continue to accept back-up information from the server white the pack process continues to execute to switch the information server from a first active audit trail to a second inactive audit trail. As a result, the database may remain unlocked for at least a duration of the pack process. When a first portion of the pack process is complete, the second inactive audit trail may become the active audit trail and the files written into the third audit trail may be transferred to the second audit trail. During this second portion of the pack process, the database may be temporarily locked. The duration of time that the database is locked during the transfer of files from the third audit trail to the second active audit trail may be smaller than the duration of time the database is locked during the pack process as practiced in the conventional methods described above. In some cases, this reduction in the duration of time may be at least a 50% reduction. This is due, in part, to the percentage of free storage capacity for the third audit trail creating a small likelihood that the third audit trail will fill to capacity during the pack process.

According to one embodiment, a method may include receiving a query for a database in communication with the information server; executing the query against the database; storing a record of the query in a first audit trail; determining that a size of the first audit trail has reached a predetermined threshold size; and when the size has reached the predetermined threshold size, the method may further include executing the steps comprising initiating a pack process on the first audit trail to switch from the first audit trail to a second audit trail; receiving a second query for the database while the pack process is executing; and storing a record of the second query in a third audit trail while the pack process is executing.

According to another embodiment, a method may include receiving information through a server engine from an application, wherein the information may comprise updated information; transmitting the information from an application to a database; initiating an audit process to store a copy of the information to a first audit trail; initiating a pack process in response to the first audit trail being filled to capacity; generating a third audit trail in response to the first audit trail being filled to capacity; and storing a copy of the information through the audit process to a third audit trail in response to the first audit trail being filled to capacity.

According to an additional embodiment, a method may include receiving a command to run a pack process; initiating a pack process in response to a first audit trail being filled to capacity; switching the first audit trail from active to inactive and a second audit trail from inactive to active; locking a database to prevent updates; transferring information from a third audit trail to the second trail that is active; and unlocking the database to resume updates.

According to another embodiment, an apparatus may include a processor and a memory coupled to the processor. The processor may be configured to perform the steps of receiving a query for a database in communication with the information server; executing the query against the database; storing a record of the query in a first audit trail; determining that a size of the first audit trail has reached a predetermined threshold size; and when the size has reached the predetermined threshold size executing the steps including initiating a pack process on the first audit trail to switch from the first audit trail to a second audit trail; receiving a second query for the database while the pack process is executing; and storing a record of the second query in a third audit trail while the pack process is executing.

According to yet another embodiment, an apparatus may include a processor and a memory coupled to the processor. The processor may be configured to perform the steps of receiving information through a server engine from an application, wherein the information may comprise updated information; transmitting the information from an application to a database; initiating an audit process to store a copy of the information to a first audit trail; initiating a pack process in response to the first audit trail being filled to capacity; generating a third audit trail in response to the first audit trail being filled to capacity; and storing a copy of the information through the audit process to a third audit trail in response to the first audit trail being filled to capacity.

According to an additional embodiment, an apparatus may include a processor and a memory coupled to the processor. The processor may be configured to perform the steps of receiving a command to run a pack process; initiating a pack process in response to a first audit trail being filled to capacity; switching the first audit trail from active to inactive and a second audit trail from inactive to active; locking a database to prevent updates; transferring information from a third audit trail to the second trail that is active; and unlocking the database to resume updates.

According to a further embodiment, a computer program product includes a non-transitory medium having code to receive a query for a database in communication with the information server; code to execute the query against the database; code to store a record of the query in a first audit trail; code to determine that a size of the first audit trail has reached a predetermined threshold size; and when the size has reached the predetermined threshold size, the method may further include code to initiate a pack process on the first audit trail to switch from the first audit trail to a second audit trail; code to receive a second query for the database while the pack process is executing; and code to store a record of the second query in a third audit trail while the pack process is executing.

According to another embodiment, a computer program product includes a non-transitory medium having code to receive information through a server engine from an application, wherein the information may comprise updated information; code to transmit the information from an application to a database; code to initiate an audit process to store a copy of the information to a first audit trail; code to initiate a pack process in response to the first audit trail being filled to capacity; code to generate a third audit trail in response to the first audit trail being filled to capacity; and code to store a copy of the information through the audit process to a third audit trail in response to the first audit trail being filled to capacity.

According to an additional embodiment, a computer program product includes a non-transitory medium having code to receive a command to run a pack process; code to initiate a pack process in response to a first audit trail being filled to capacity; code to switch the first audit trail from active to inactive and a second audit trail from inactive to active; code to lock a database to prevent updates; code to transfer information from a third audit trail to the second trail that is active; and code to unlock the database to resume updates.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a limitation of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
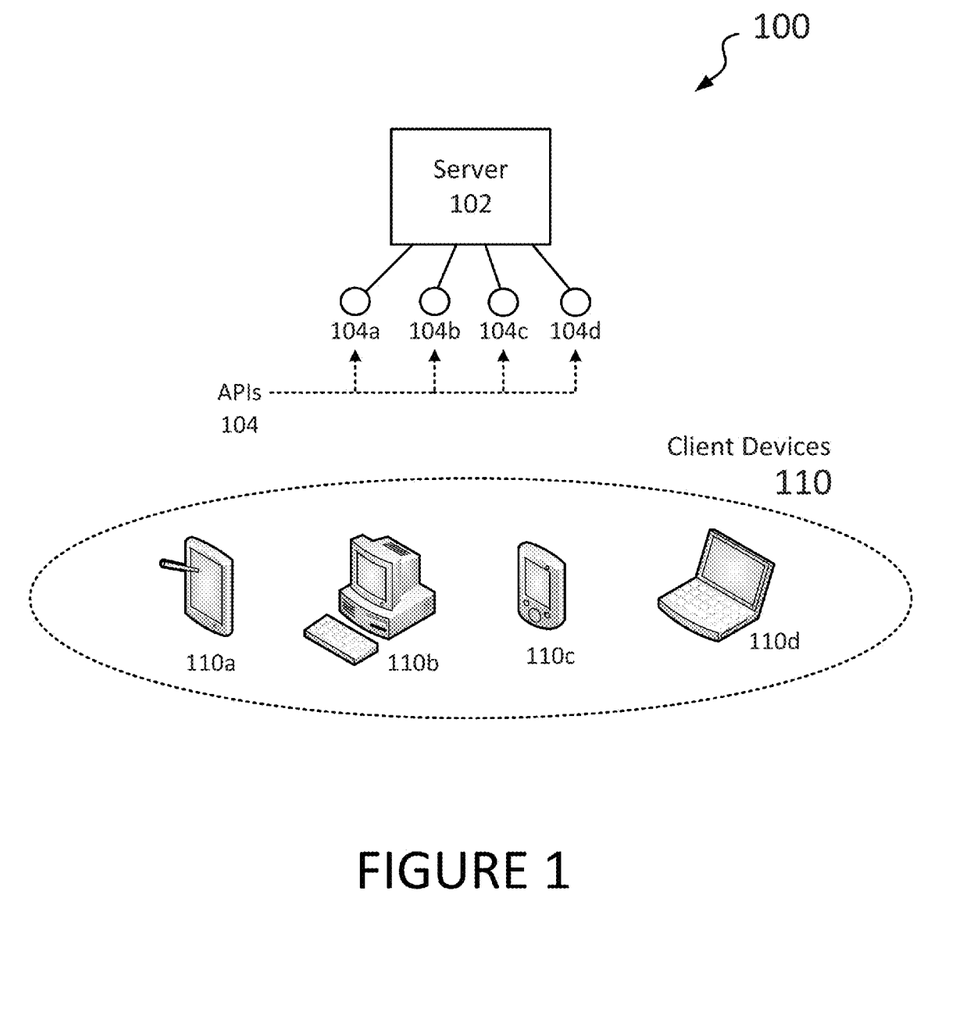
FIG. 1 illustrates a communications environment where a client interacts with a server according to one embodiment.

FIG. 1 illustrates a communications environment where a client interacts with a server according to one embodiment. A server 102 may provide a collection of application programming interfaces (APIs) 104, including 104a-d, to be used by client devices 110 to design or access a database application. The client devices 110 may include wired and/or wireless devices, such as a tablet computer 110a, a desktop computer 110b, handheld mobile device 110c, and/or a laptop computer 110d. In addition, other devices (not shown) such as a workstation, a mobile phone, and a personal digital assistant (PDA) may also be included in the list of client devices. In one embodiment of communications environment 100 where server 102 hosts many different applications, each of the client devices 110 may interact with a unique API 104. For example, tablet computer 110a may utilize API 104a, desktop computer 110b may utilize API 104*b*, handheld mobile device 110*c* may utilize API 104*c*, and laptop computer 110*d* may utilize API 104*d*.

In another embodiment where server 102 hosts a single application, server 102 may provide a single API 104 for the application that is accessed by all of the client devices 110. In this instance, only one of the client devices 110 may interact with the API 104 at a given time period. In a further embodiment where a single application is hosted by server 102, copies of APIs 104 may be replicated and utilized by each of the client devices 110. In yet another embodiment, each of the client devices 110 may interact with more than one API 104 in which the APIs 104 are provided to operate the same application or unique applications. In an additional embodiment, each of the client devices 110 may interact with the same API 104 at the same time as long as the server 102 is capable of handling dynamic updates. One skilled in the art can appreciate other configurations and scenarios in which any of the client devices 110 access any of the APIs 104 to design database applications.

Figure 2:
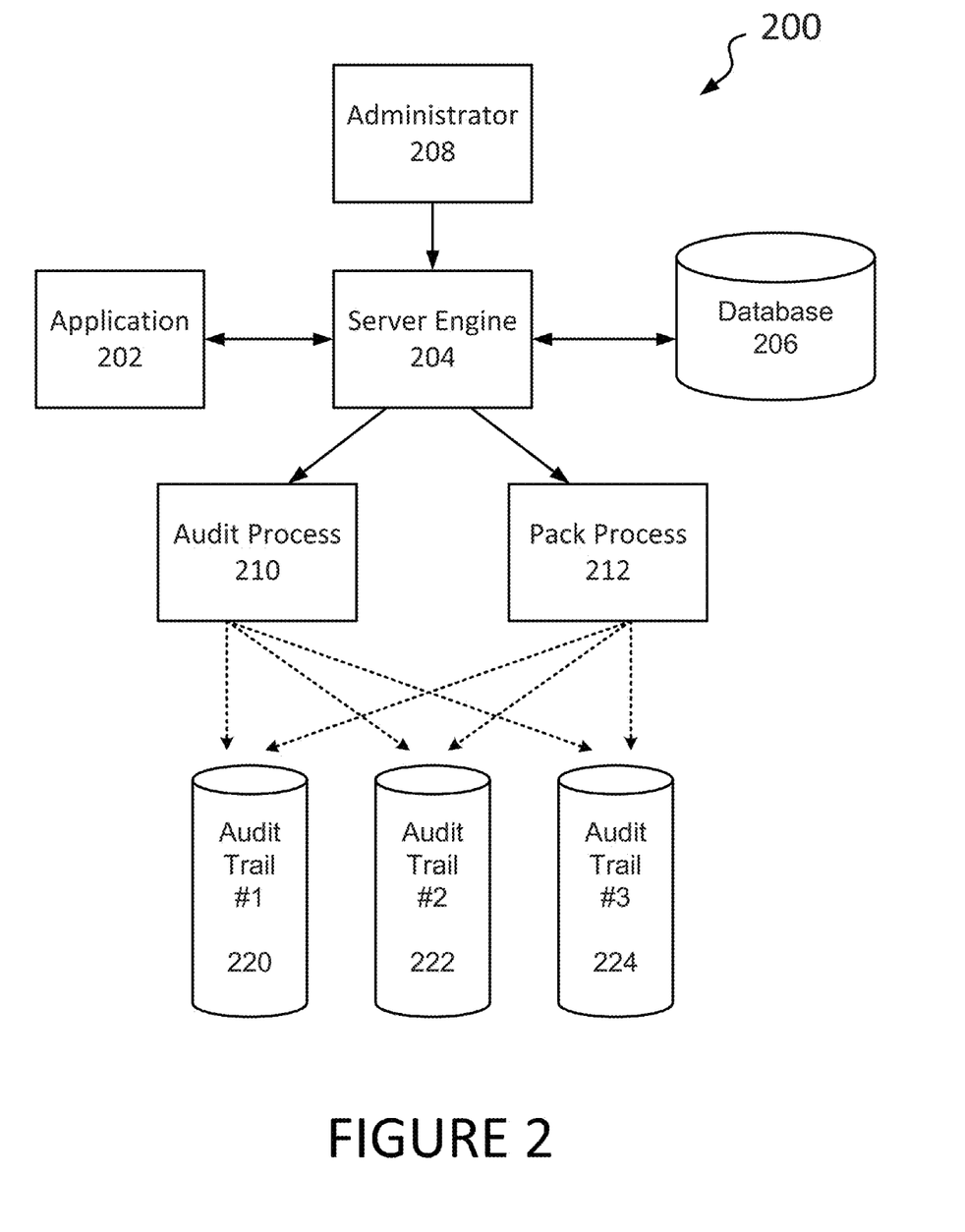
FIG. 2 illustrates an overview of a server engine processing data and storing files according to one embodiment.

FIG. 2 illustrates an overview of a server engine processing data and storing files according to one embodiment. When one of the client devices 110 accesses the server to request an operation, the client device may utilize an application 202 to communicate with a server engine 204 to process the request. The request may include storing a new file, modifying the contents of an existing file, such as updating an employee address, adding new information to an existing file, gathering stored information to perform a calculation and the like. The request may be structured as a query to execute against a database 206. Server engine 204 may handle the request, and send the desired information back to the application 202. In one embodiment, the server engine 204 may send a confirmation that a task has been completed. In another embodiment, the server engine 204 may access the database 206 to assist in processing the request. Database 206 may comprise any type of data or metadata stored for a finite or infinite period of time. In another embodiment, database 206 may contain encrypted data of hash values of data. In another embodiment, the server engine 204 may include a cryptosystem that encrypts and decrypts data from the database 206 and the client device 110 to increase the security of data transmission. In another embodiment, the administrator 208 may manage the server engine 204 to handle all requests and operations performed at the server engine 204.

The data stored on the database 206 may be corrupted by any number of unexpected incidents. If the data is critical to a company's operation, the data may be backed up, such as to another location. To facilitate this step, in one embodiment, the client device 110 may enable an audit feature on the application 202 by setting an audit flag to "ENABLE." The audit feature may be configured by the administrator 208 for use by the client device on the application 202. When the administrator 208 sees the audit flag set to "ENABLE," the administrator 208 may direct the server engine 204 to start an audit process 210 or the server engine 204 may automatically start the audit process 210.

In one embodiment, the audit process 210 may execute instructions to store files or records into a storage location called an audit trail. In another embodiment, audit process 210 may comprise a module with its own administrator that is responsible for administrating the audit process 210. Files or modifications to files written to the server and stored on database 206 may also be stored on one of the available audit trails. For example, when an UPDATE query is executed against the database 206 causing the contents of the database 206 to change, a record describing the modifications to the database 206 by the UPDATE query may be stored in the audit trail.

An information server system may include three (or more) audit trails: Audit Trail #1 220, Audit Trail #2 222, or Audit Trail #3 224. In one embodiment, each of the audit trails may comprise blocks of memory that range in size from 32 Megabits (Mb) to 16 Gigabytes (GB). One audit trail of the trails 220, 222, and 224 may serve as an active trail, while the other two may serve as inactive trails. One of the two inactive trails may be used as a temporary store for backing up information while the pack process 212 switches from one audit trail to another. In one embodiment, files added on audit trails may be stored in blocks. Files may be stored on the active audit trail until the audit trail is filled to capacity. When the active audit trail is filled to capacity, the server engine 204 may redirect the pack process 212 to switch to another audit trail.

The pack process 212 may execute instructions to deactivate the active audit trail and activate the inactive audit trail. For example, if Audit Trail #1 220 is active, and Audit Trail #2 222 is inactive, after the audit trail #1 220 reaches capacity, Audit Trail #1 220 may become inactive and Audit Trail #2 222 may become active. During the transition from audit trail #1 220 to audit trail #2 222, information regarding modifications to the database 206 that would conventionally be stored on the active audit trail may be temporarily stored on a third audit trail #3 224. After the transition is completed, the database 206 may be temporarily locked, and the files stored on the third audit trail #3 224 may be transferred to the new active audit trail #2 222. When the database 206 is temporarily locked, client devices may not be able to utilize the server system to write changes or new files into the database 206. After the transfer, the database 206 may be unlocked and made available for the client devices 110 and server engine 204. In one embodiment, third audit trail #3 224 may be created once the pack process transition is initiated and destroyed after filed are transferred to the new active trail. In another embodiment, the third audit trail #3 224 may initially be an inactive trail that becomes active when the pack process initiates.

Figure 3A:
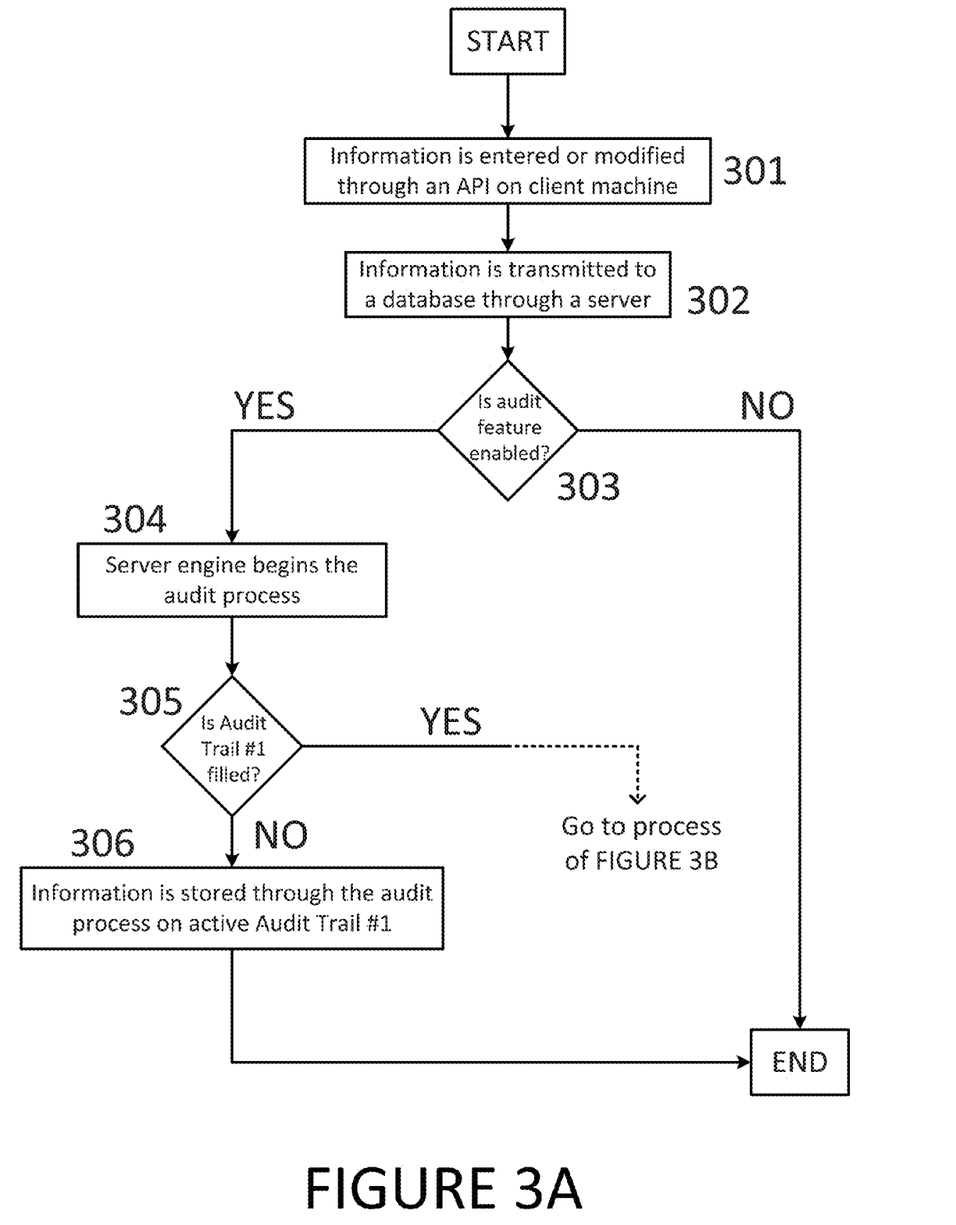
FIG. 3A is a flow chart illustrating the process of transmitting information through the audit process to an active audit trail according to one embodiment.

FIG. 3A is a flow chart illustrating the process of transmitting information through the audit process to an active audit trail according to one embodiment. This process starts at step 301 where a piece of information may be entered or modified API 104 by the client device 110 accessing applications that interface with the server engine. In one embodiment, the information may comprise a new file or a change to the contents of a file. At step 302, the information may be transmitted to a database 206 through the server engine 204.

At step 303, a decision block is encountered in which the information server may determine if the client device 110 has enabled the audit feature on the application 202 by setting an audit flag to "ENABLE." If the audit flag is not enabled, the process of FIG. 3A terminates. This signifies that a copy of the information stored on the database 206 is not backed up to an audit trail through an audit process 210. The client device 110 may choose to create a backup copy of the information through a method external to the Business Information Server system, such as saving the information to a disk or an internal memory.

If the audit flag is enabled, the process proceeds to step 304 where the server engine 204 initiates the audit process. During the audit process, the server may initially select to store the backup copy of the information on Audit Trail #1 220 because Audit Trail #1 220 is active. Conversely, in one embodiment, if Audit Trail #1 220 is not active, the server may select any of the three audit trails that is active to store the information.

At step 305, the administrator 208 may determine if Audit Trail #1 220 is filled to capacity. If Audit Trail #1 220 is not filled to capacity, the process continues to step 306, where the information transmitted through the audit process 210 is stored on Audit Trail #1 220. However, if the Audit Trail #1 220 is filled to capacity, the process continues to FIG. 3B. In one embodiment, an audit trail may be deemed "filled to capacity" when there are zero bytes of available storage on the audit trail. In another embodiment, an audit trail may be deemed "filled to capacity" when a threshold of a minimum number of bytes of available storage on the audit trail is reached. In a particular embodiment, that threshold may be set at 0.9 indicating that the audit trail is 90% filled to capacity. In a further embodiment, an audit trail may be deemed "filled to capacity" when the size of the proposed information to be stored on the audit trail is larger than the available space on the audit trail. In this scenario, blocks of information may be stored on the audit trail until there are zero bytes available on the audit trail or the threshold is reached.

Figure 3B:
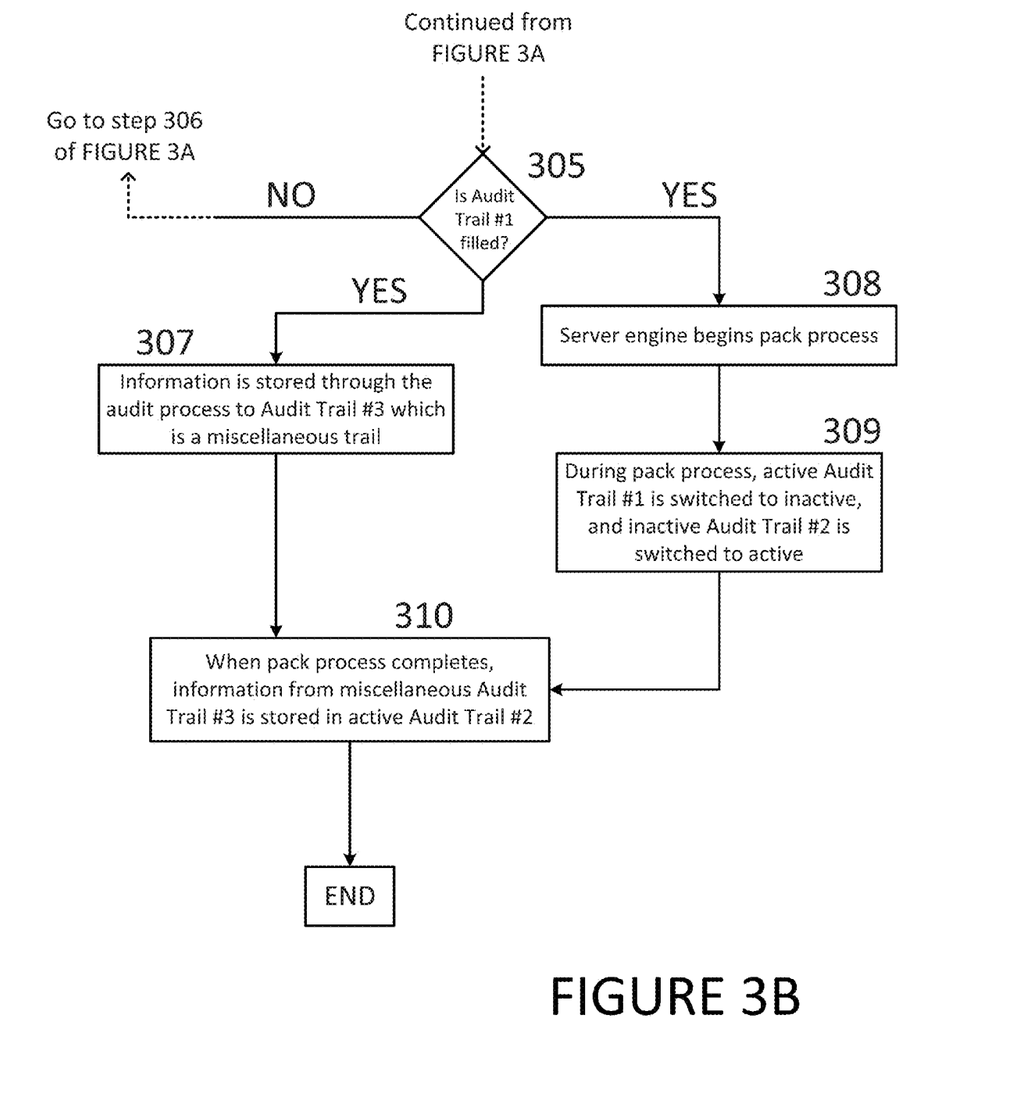
FIG. 3B is a flow chart illustrating the process of activating a new audit trail through the pack process when a current audit trail is filled to capacity according to one embodiment.

FIG. 3B is a flow chart illustrating the process of activating a new audit trail through the pack process when a current audit trail is filled to capacity according to one embodiment. Continuing from step 305, if Audit Trail #1 220 is filled to capacity, the administrator 208 directs the server engine 204 to begin the pack process 212 in step 308. The pack process 212 may start automatically in response to Audit Trail #1 220 filling to capacity, in step 309, during the pack process, Audit Trail #1 220 may be switched from active to inactive, and a second audit trail, Audit Trail #2 222, may be switched from inactive to active.

Concurrently, while steps 308 and/or 309 are being performed and when the pack process begins, information intended to be stored to Audit Trail #1 220 may be stored on Audit Trail #3 224, which functions as a temporary trail at step 307. Conventionally, when the pack process 212 begins, the database 206 is locked throughout the process. However, in an embodiment of the invention, the database 206 is not locked during at least a portion of the pack process 212 because the information to be backed up is stored on the third trail, so the operation of the Business Information Server system may proceed uninterruptedly. Finally, in step 310, when the pack process completes, the information that was stored on the third trail, Audit Trail #3 224, is copied to the active Audit Trail #2 222. During this step, the database 206 may be temporarily locked, and the audit flag may be temporarily set to "DISABLE." However, in one embodiment, the duration of time that the database 206 is locked during the transfer of files from the third audit trail to the current active audit trail when the pack process is completed may be a minimum of 50% less than the duration of time the database 206 is locked during the pack process in the conventional method. After the pack process 212 completes, New information to be backed up may be stored on Audit Trail #2 222. In one embodiment, the information on Audit Trail #1 220 may be stored on a disk to free up available storage space on the audit trail for future use.

Figure 3C:
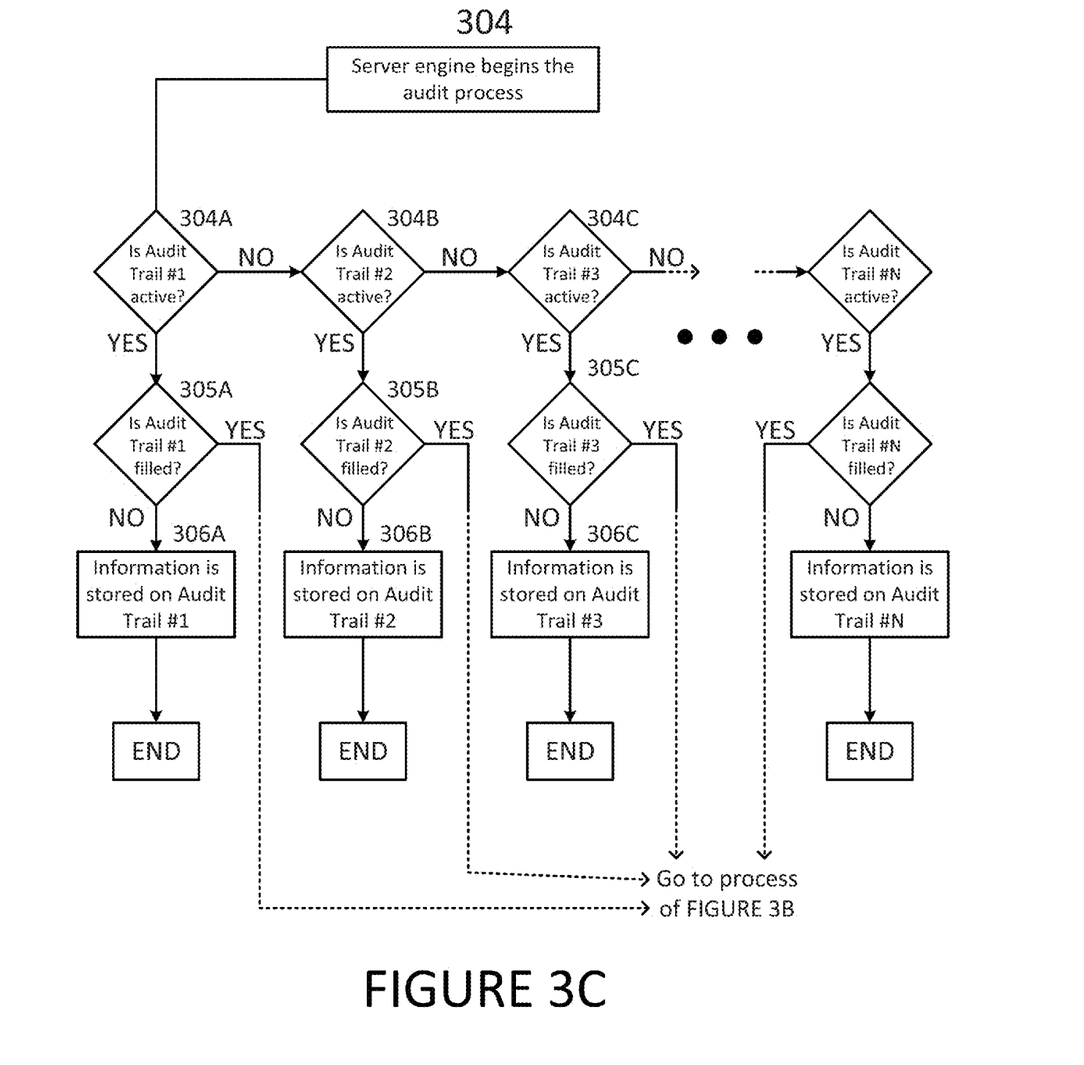
FIG. 3C is a flow chart illustrating the process of querying several audit trails to gather audit trail status information according to one embodiment.

FIG. 3C is a flow chart illustrating the process of querying several audit trails to gather audit trail status information according to one embodiment. Referring to step 304 of the process in FIG. 3A, after the server engine 204 initiates the audit process 210, an additional decision block may be encountered in which the server may determine if Audit Trail #1 220 is active at step 304A. If Audit Trail #1 220 is active, a second decision block may be encountered in which the server may determine if Audit Trail #1 220 is filled to capacity at step 305A. If Audit Trail #1 220 is not filled to capacity, the process continues to step 306A where information may be stored on Audit Trail #1 220. In contrast, if the Audit Trail #1 220 is filled to capacity, the process proceeds to step 305 of FIG. 3B.

Referring back to the decision block at step 304A, in one embodiment, if the Audit Trail #1 220 is not active, the server may proceed to the decision block at step 304B. Similarly, if the Audit Trail #2 222 is not active, the administrator may proceed to the decision block at step 304C. If the Audit Trail #3 224 is not active, the administrator may proceed to another decision block to determine the next active audit trail in the series. In another embodiment, this process may continue until an active audit trail is identified. Once an active audit trail is identified, the process may continue to step 305. In one embodiment, where there are three audit trails, as in the Business Information Server system, once it is determined that the first two audit trails are inactive, the last audit trail may be automatically deemed as active.

Figure 4:
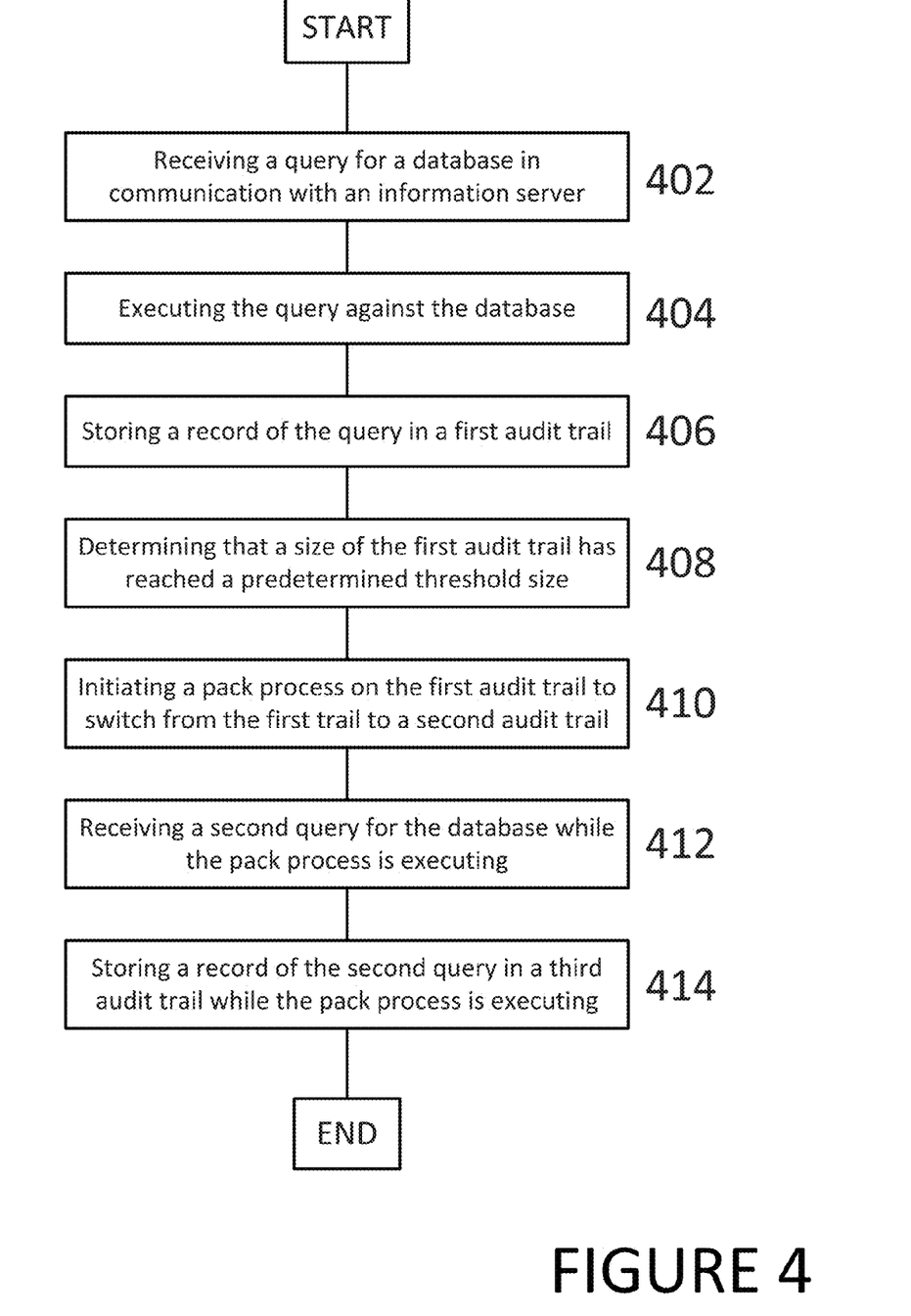
FIG. 4 is a flow chart illustrating a method of storing information in an audit trail by a server engine according to one embodiment.

FIG. 4 is a flow chart illustrating a method of storing information in an audit trail by a server engine according to one embodiment. The method begins at step 402 where the server engine 204 receives a query for a database in communication with an information server. The query may be a request to edit the contents of a file. In some embodiments, this information may also include a request to store a new file, add new information to an existing file, gather stored information to perform a calculation from the database 206 and the like. Next, the query may be executed against the database in step 404.

If the server engine 204 recognizes that the audit feature on the application 202 has been enabled by setting an audit flag to "ENABLE," the server engine 204 initiates the audit process 210 by storing a record of the query in a first audit trail at step 406. In step 408, the server engine 204 may determine that the size of the first audit trail has reached a predetermined threshold size. When this occurs, a series of steps may be performed to start a pack process. At step 410, the pack process may be initiated on the first audit trail to switch from the first audit trail to a second trail. While the pack process is executing, a second query may be received by the server engine 204 for the database 206 at step 412. Finally, at step 414, a record of the second query may be stored in a third audit trail while the pack process is executing.

Figure 5A:
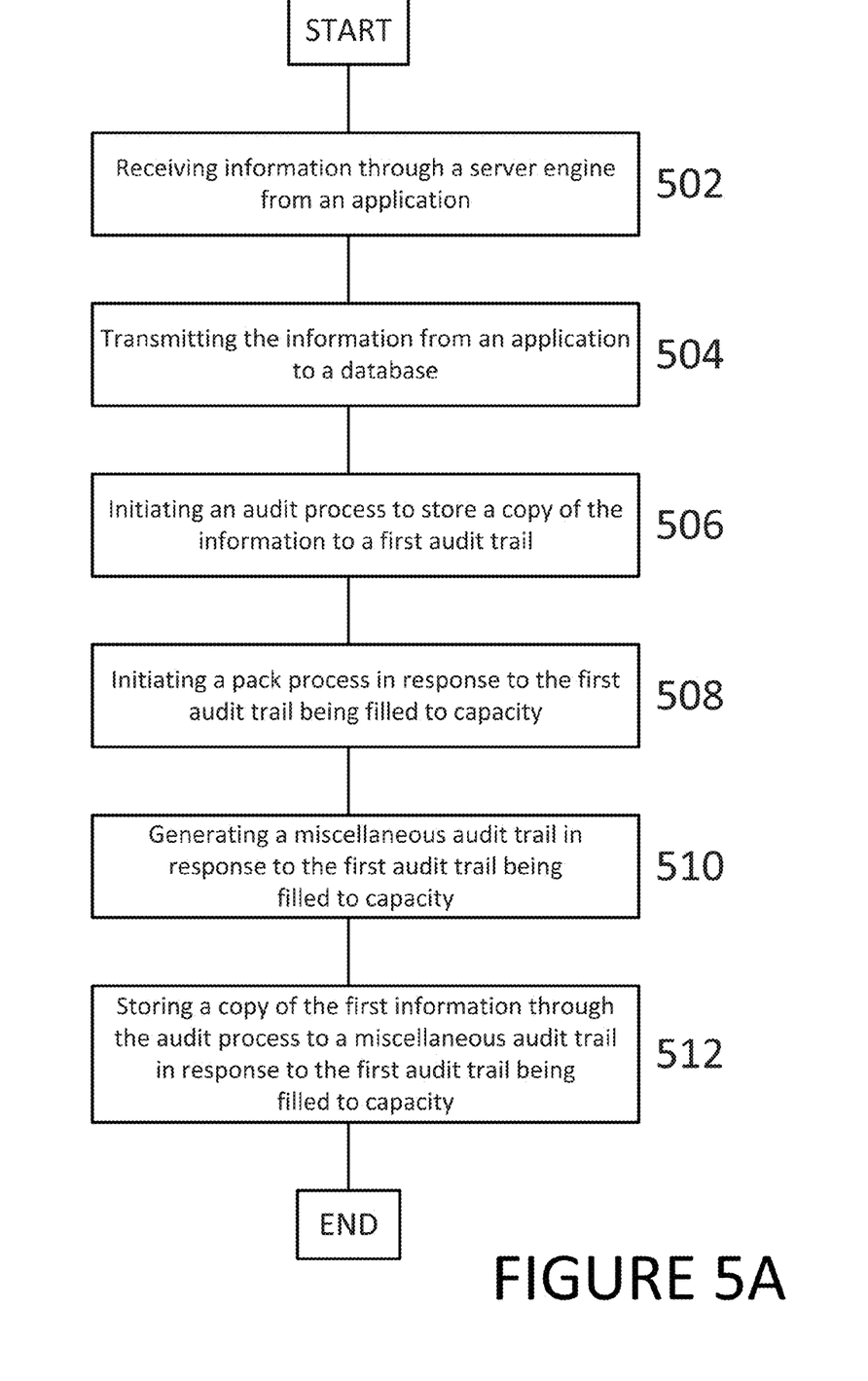
FIG. 5A is a flow chart illustrating another method of storing information in an audit trail by a server engine according to another embodiment.

FIG. 5A is a flow chart illustrating another method of storing information in an audit trail by a server engine according to another embodiment. The method begins at step 502 where the server engine 204 receives information from an application 202 that receives information from the client device 110. This information may include a request to modify the contents of a file stored in database 206. In other embodiments, this information may also include a request to store a new file, add new information to an existing file, gather stored information to perform a calculation from the database 206 and the like. At step 504, this information is transmitted to the database 206 for storing.

If the server engine 204 recognizes that the audit feature on the application 202 has been enabled by setting an audit flag to "ENABLE," the server 204 initiates the audit process 210 to store a copy of the information to a first audit trail at step 506. At step 508, when the first audit trail is filled to capacity, the server initiates a pack process 212. When the pack process 212 begins, the server, at step 510, generates a third audit trail to store the information. The third audit trail may provide a temporary location to store information when the first audit trail is filled to capacity. Finally, the information is temporarily stored at step 512. In another embodiment, once the pack process 212 is initiated, a notice of this activity may be submitted by the server to the client device 110 through the application 202. Because there is a period of delay associated with the pack process 212, a notice of this type may allow the client or user of the client device 110 to plan accordingly for a temporary delay in utilization of the server.

Figure 5B:
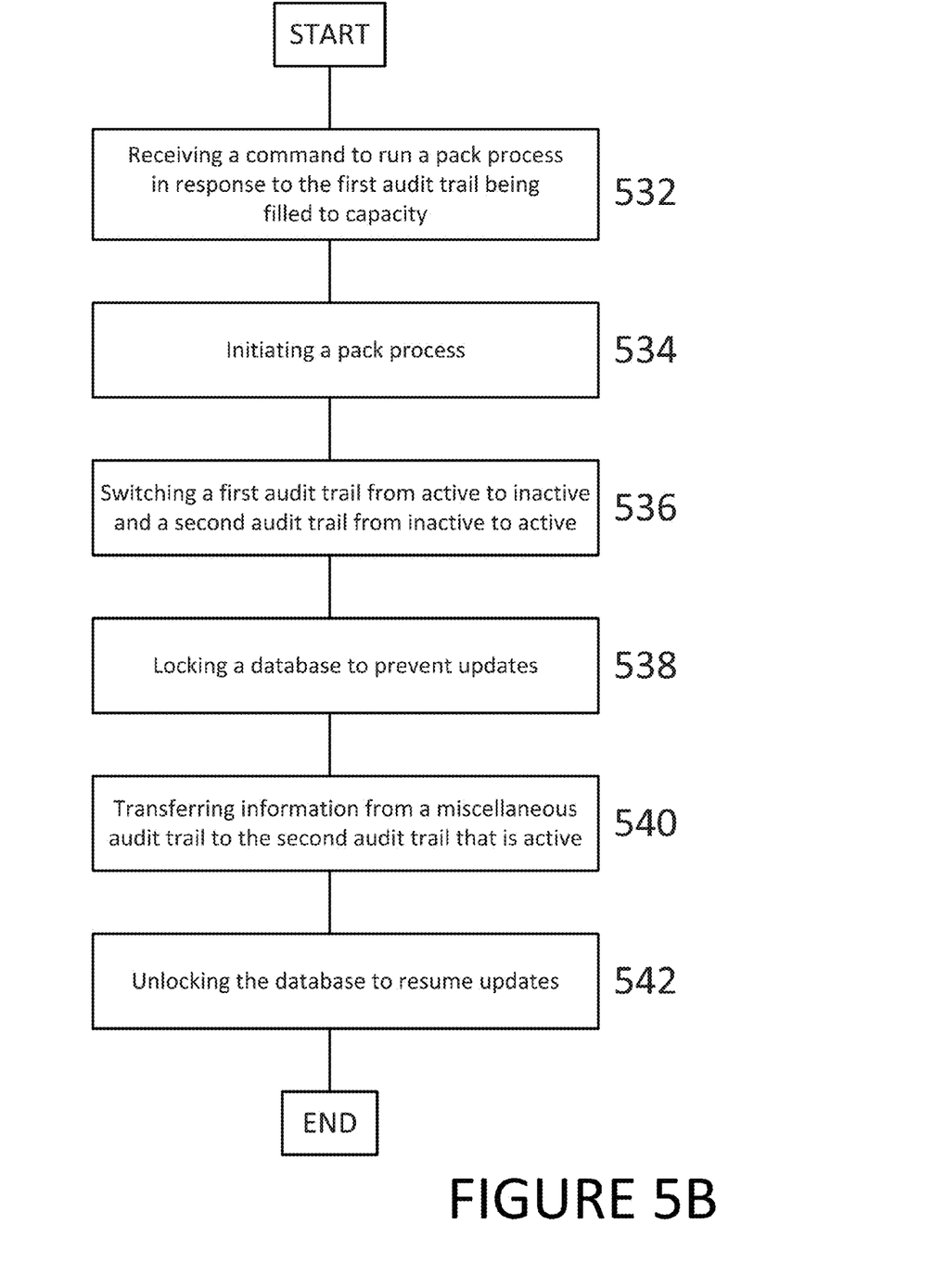
FIG. 5B is a flow chart illustrating a method of running a pack process according to one embodiment.

FIG. 5B is a flow chart illustrating a method of running a pack process according to one embodiment. The method begins at step 532 where the pack process receives a command to run a pack process. Step 532 may be performed in response to storage space of an active audit trail filling to capacity. At step 534, the pack process initiates. When the pack process 212 begins, the server switches the state of a first audit trail from active to inactive, and the state of a second audit trail from inactive to active at step 536. During the pack process, the database 206 may remain available for the server engine 204 to access.

When the pack process is completed, at step 538, the server temporarily locks the database 206. During the lock, no additions or updates to the database 206 may be made. At step 540, the server transfers information stored in the third audit trail to the active, second audit trail. Finally, in step 542, the database 206 is unlocked, and activity between the client device 110, server engine 204, and the database 206 may be resumed. In one embodiment, once an audit trail is filled capacity, the information on that trail may be saved to an external location or maintained in the trail In a further embodiment, if the information is maintained in an audit trail that is filled to capacity, that audit trail may stay inactive throughout the lifetime of the server system.

Figure 6:
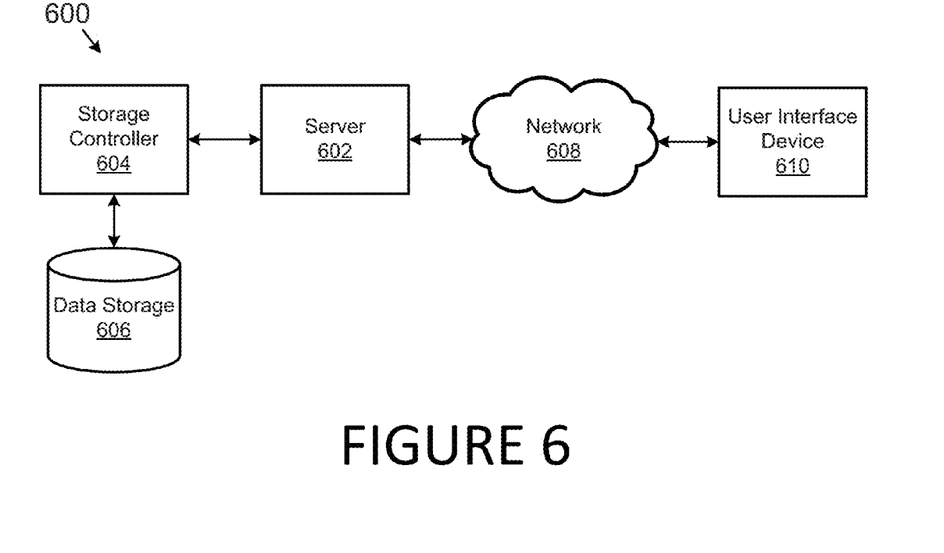
FIG. 6 is a block diagram illustrating a computer network according to one embodiment.

FIG. 6 is a block diagram illustrating a computer network according to one embodiment. The system 600 may include a server 602, a data storage device 606, a network 608, and a user interface device 610. In a further embodiment, the system 600 may include a storage controller 604, or storage server configured to manage data communications between the data storage device 606 and the server 602 or other components in communication with the network 608. In an alternative embodiment, the storage controller 604 may be coupled to the network 608. The system 600 may support code analysis by hosting the database 206 of FIG. 2 on the server 602.

In one embodiment, the user interface device 610 is referred to broadly and is intended to encompass a suitable processor-based device such as a desktop computer, a laptop computer, a personal digital assistant (PDA) or tablet computer, a smartphone, or other mobile communication device having access to the network 608. In a further embodiment, the user interface device 610 may access the Internet or other wide area or local area network to access a web application or web service hosted by the server 602 and may provide a user interface for communicating with the application 202 of FIG. 2.

The network 608 may facilitate communications of data between the server 602 and the user interface device 610. The network 608 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 7:
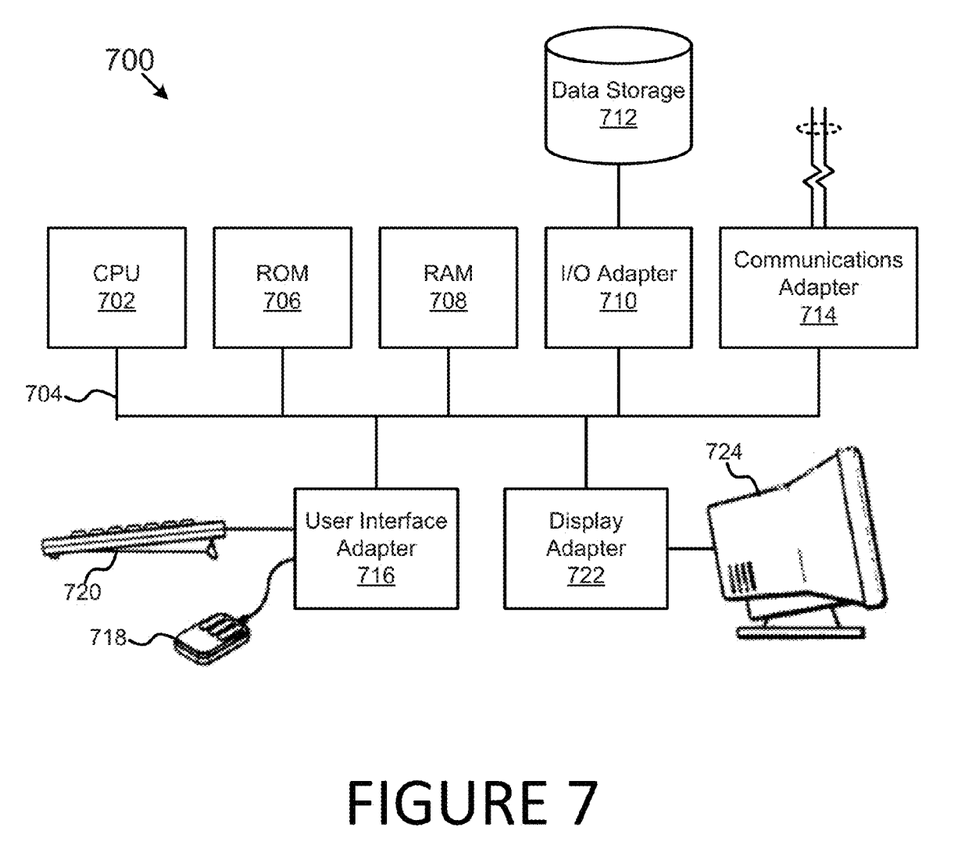
FIG. 7 is a block diagram illustrating a computer system 700 adapted according to certain embodiments of the server 602 and/or the user interface device 610.

FIG. 7 is a block diagram illustrating a computer system 700 adapted according to certain embodiments of the server 602 and/or the user interface device 610. The central processing unit ("CPU") 702 is coupled to the system bus 704. Although only a single CPU is shown, multiple CPUs may be present. The CPU 702 may be a general purpose CPU or microprocessor, graphics processing unit ("GPU"), and/or microcontroller. The present embodiments are not restricted by the architecture of the CPU 702 so long as the CPU 702, whether directly or indirectly, supports the operations as described herein. The CPU 702 may execute the various logical instructions according to the present embodiments.

The computer system 700 may also include random access memory (RAM) 708, which may be synchronous RAM (SRAM), dynamic RAM (DRAM), synchronous dynamic RAM (SDRAM), or the like. The computer system 700 may utilize RAM 708 to store the various data structures used by a software application. The computer system 700 may also include read only memory (ROM) 706 which may be PROM, EPROM, EEPROM, optical storage, or the like. The ROM may store configuration information for booting the computer system 700. The RAM 708 and the ROM 706 hold user and system data, and both the RAM 708 and the ROM 706 may be randomly accessed.

The computer system 700 may also include an input/output (I/O) adapter 710, a communications adapter 714, a user interface adapter 716, and a display adapter 722. The I/O adapter 710 and/or the user interface adapter 716 may, in certain embodiments, enable a user to interact with the computer system 700. In a further embodiment, the display adapter 722 may display a graphical user interface (GUI) associated with a software or web-based application on a display device 724, such as a monitor or touch screen.

The I/O adapter 710 may couple one or more storage devices 712, such as one or more of a hard drive, a solid state storage device, a flash drive, a compact disc (CD) drive, a floppy disk drive, and a tape drive, to the computer system 700. According to one embodiment, the data storage 712 may be a separate server coupled to the computer system 700 through a network connection to the I/O adapter 710. The communications adapter 714 may be adapted to couple the computer system 700 to the network 608, which may be one or more of a LAN, WAN, and/or the Internet. The user interface adapter 716 couples user input devices, such as a keyboard 720, a pointing device 718, and/or a touch screen (not shown) to the computer system 700. The keyboard 720 may be an on-screen keyboard displayed on a touch panel. The display adapter 722 may be driven by the CPU 702 to control the display on the display device 724. Any of the devices 702-722 may be physical and/or logical.

The applications of the present disclosure are not limited to the architecture of computer system 700. Rather the computer system 700 is provided as an example of one type of computing device that may be adapted to perform the functions of the server 602 and/or the user interface device 610. For example, any suitable processor-based device may be utilized including, without limitation, personal data assistants (RDAs), tablet computers, smartphones, computer game consoles, and multi-processor servers. Moreover, the systems and methods of the present disclosure may be implemented on application specific integrated circuits (ASICs), very large scale integrated (VLSI) circuits, or other circuitry. In fact, persons of ordinary skill in the art may utilize any number of suitable structures capable of executing logical operations according to the described embodiments. For example, the computer system may be virtualized for access by multiple users and/or applications.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media. Additionally, the firmware and/or software may be executed by processors integrated with components described above.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   receiving, at an information server, a query for a database in communication with the information server;
   executing, by the information server, the query against the database;
   storing, by the information server, a record of the query in a first audit trail;
   determining, by the information server, that a size of the first audit trail has reached a predetermined threshold size; and
   when the size has reached the predetermined threshold size executing the steps comprising:
   initiating, by the information server, a pack process on the first audit trail to switch from the first audit trail to a second audit trail;
   receiving, by the information server, a second query for the database while the pack process is executing; and
   storing, by the information server, a record of the second query in a third audit trail while the pack process is executing.

2. The method of claim 1, wherein the pack process comprises a first phase during which the information server is transitioned from the first audit trail to the second audit trail and comprises a second phase during which records stored in the third audit trail are copied to the second audit trail.

3. The method of claim 2, further comprising:
   detecting, by the information server, the pack process is ready to enter the second phase; and
   locking, by the information sever, the database during the second phase of the pack process.

4. The method of claim 3, further comprising unlocking, by the information server, the database after the records of the third audit trail are copied to the second audit trail.

5. The method of claim 1, wherein the step of determining whether the size of the first audit trail has reached the predetermined threshold size comprises determining whether the size of the first audit trail has reached approximately eighty-ninety percent of a storage capacity of the first audit trail.

6. The method of claim 1, further comprising, after the pack process has completed, executing the steps comprising:
   receiving, by the information server, a third query against the database;
   executing, by the information server, the third query against the database; and
   storing, by the information server, a record of the third query in a second audit trail.

7. An apparatus, comprising:
   a processor; and
   a memory coupled to the processor, in which the processor is configured to perform the steps of:
   receiving, at an information server, a query for a database in communication with the information server;
   executing, by the information server, the query against the database;
   storing, by the information server, a record of the query in a first audit trail;
   determining, by the information server, that a size of the first audit trail has reached a predetermined threshold size; and
   when the size has reached the predetermined threshold size, the processor is further configured to perform the steps of:
   initiating, by the information server, a pack process on the first audit trail to switch from the first audit trail to a second audit trail;
   receiving, by the information server, a second query for the database while the pack process is executing; and
   storing, by the information server, a record of the second query in a third audit trail while the pack process is executing.

8. The apparatus of claim 7, wherein the pack process comprises a first phase during which the information server is transitioned from the first audit trail to the second audit trail and comprises a second phase during which records stored in the third audit trail are copied to the second audit trail.

9. The apparatus of claim 8, in which the processor is further configured to perform the steps of:
   detecting, by the information server, the pack process is ready to enter the second phase; and
   locking, by the information sever, the database during the second phase of the pack process.

10. The apparatus of claim 9, in which the processor is further configured to perform the step of unlocking, by the information server, the database after the records of the third audit trail are copied to the second audit trail.

11. The apparatus of claim 7, wherein the step of determining whether the size of the first audit trail has reached the predetermined threshold size comprises determining whether the size of the first audit trail has reached approximately eighty-ninety percent of a storage capacity of the first audit trail.

12. The apparatus of claim 7, in which, after the pack process has completed, the processor is further configured to perform the steps of:
   receiving, by the information server, a third query against the database;
   executing, by the information server, the third query against the database; and
   storing, by the information server, a record of the third query in a second audit trail.

13. A computer program product, comprising:
   a non-transitory medium comprising:
      code to receive, at an information server, a query for a database in communication with the information server;
      code to execute, by the information server, the query against the database;
      code to store, by the information server, a record of the query in a first audit trail;
      code to determine, by the information server, that a size of the first audit trail has reached a predetermined threshold size; and
      when the size has reached the predetermined threshold size, the computer program product further comprising:
         code to initiate, by the information server, a pack process on the first audit trail to switch from the first audit trail to a second audit trail;
         code to receive, by the information server, a second query for the database while the pack process is executing; and
         code to store, by the information server, a record of the second query in a third audit trail while the pack process is executing.

14. The computer program product of claim 13, wherein the pack process comprises a first phase during which the information server is transitioned from the first audit trail to the second audit trail and comprises a second phase during which records stored in the third audit trail are copied to the second audit trail.

15. The computer program product of claim 14, further comprising:
   code to detect, by the information server, the pack process is ready to enter the second phase; and
   code to lock, by the information sever, the database during the second phase of the pack process.

16. The computer program product of claim 15, further comprising code to unlock, by the information server, the database after the records of the third audit trail are copied to the second audit trail.

17. The computer program product of claim 13, wherein the code to determine whether the size of the first audit trail has reached the predetermined threshold size comprises code to determine whether the size of the first audit trail has reached approximately eighty-ninety percent of a storage capacity of the first audit trail.

18. The computer program product of claim 13, further comprising, after the pack process has completed:
   code to receive, by the information server, a third query against the database;
   code to execute, by the information server, the third query against the database; and
   code to store, by the information server, a record of the third query in a second audit trail.

* * * * *